Patented June 17, 1924.

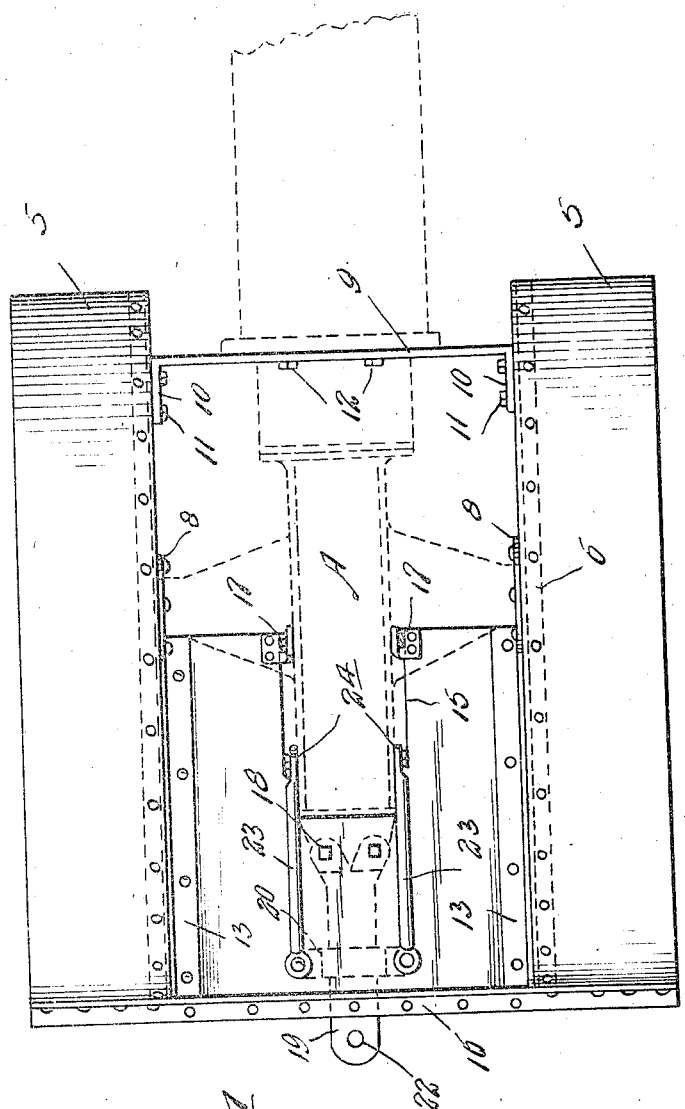

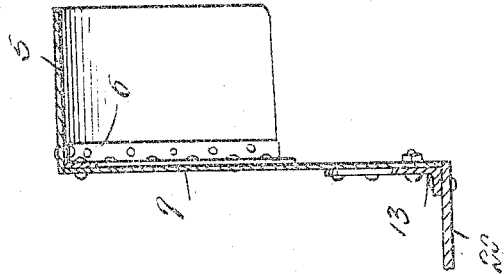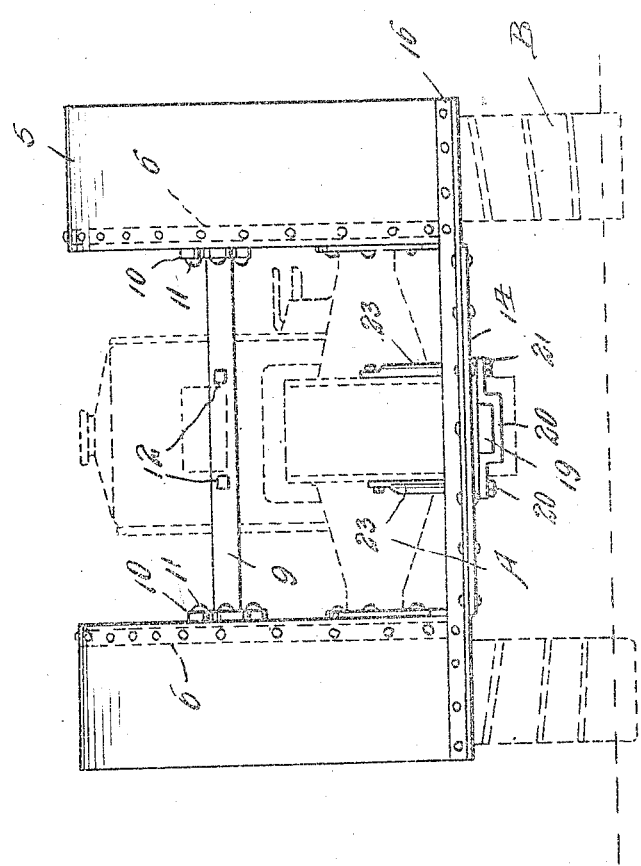

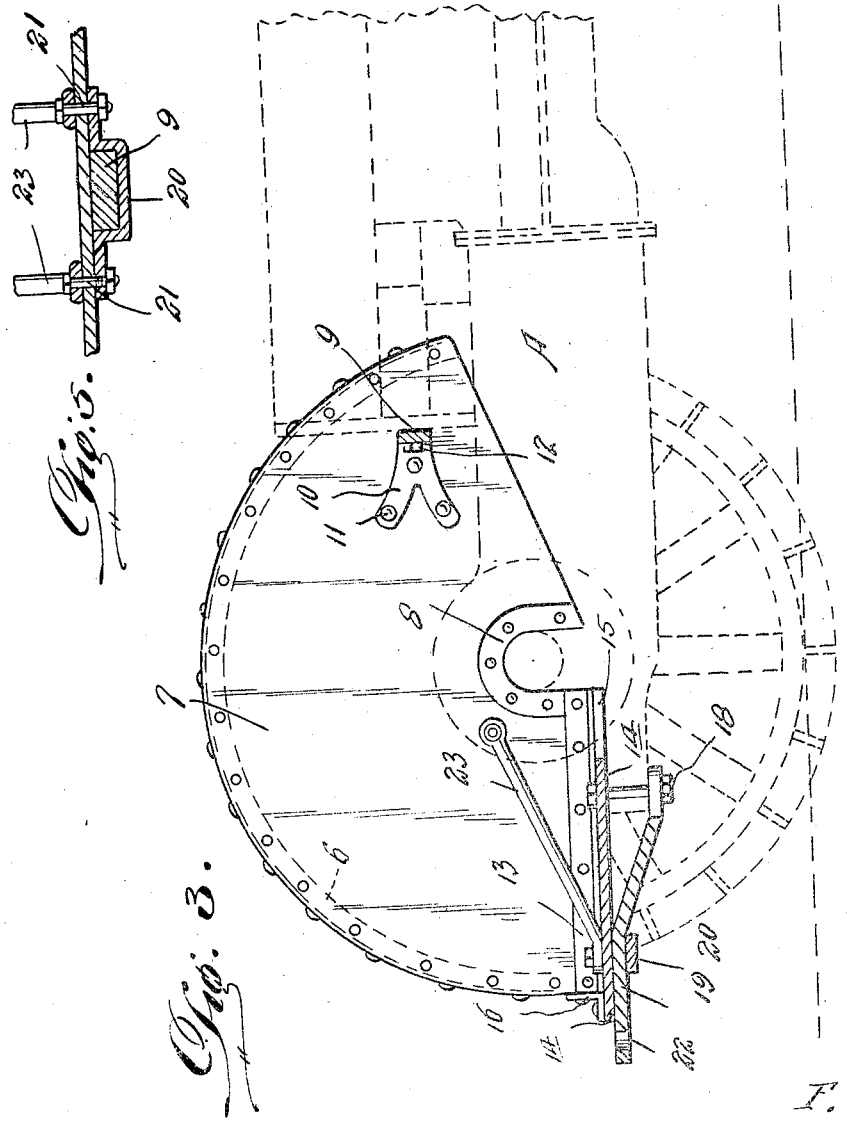

1,498,268

UNITED STATES PATENT OFFICE.

FREEMAN HARRIS, OF MILTON, PENNSYLVANIA.

OPERATOR'S PLATFORM AND TRACTION-WHEEL ATTACHMENT FOR TRACTORS.

Application filed February 27, 1923. Serial No. 621,523.

*To all whom it may concern:*

Be it known that I, FREEMAN HARRIS, a citizen of the United States, residing at Milton, in the county of Northumberland and State of Pennsylvania, have invented certain new and useful Improvements in Operators' Platforms and Traction-Wheel Attachments for Tractors, of which the following is a specification.

My invention relates to a combined operator's platform and traction wheel fender attachment for tractors, wherein the same may be in its entirety expeditiously applied to, and removed from the tractor, the same being relatively simple of construction, and substantially inexpensive of manufacture.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:

Figure 1—is a top plan view of my device applied.

Figure 2—is a rear elevational view thereof.

Figure 3—is a detail longitudinal cross sectional view of the device, showing the relative position of the same upon a tractor.

Figure 4—is a fragmentary detailed cross sectional view for more clearly disclosing one of the traction wheel fenders, and Figure 5—is a detail fragmentary cross sectional view through a portion of the platform.

Referring to the drawings in detail, and particularly to Figures 1, 2 and 3, there is fragmentarily shown in outline, a tractor including the usual rear axle housing A having traction wheels B.

My device, per se, embodies a pair of traction wheel fenders 5, the same including relatively arcuate shaped strips of material upon the inner edges of which are riveted angle irons 6, and secured in a similar manner to these angle irons, are substantially half moon shaped plates 7, the lower edges of the same being centrally notched as at 8, for permitting the positioning of these plates over the said axle housing A. Between the said plates 7 of each of the fenders 5 is a transverse brace rod 9, the ends of the same being bent rearwardly as at 10, whereby the rod 9 may be secured as at 11 to the said plates 7, it being also noted that this brace rod is bolted as at 12 to the tractor frame.

Upon the lower edges of each of the plates 7 of the fenders 5 and rearwardly of the said notches 8 therein are angle irons 13, and secured thereto is a supporting platform 14, the front end of the same being cut away as at 15 for clearance of the differential housing, of the tractor.

Secured to the rear ends of each of the fenders 5, as well as to the rear edge of the platform 14 is a transverse angle iron brace 16, the front end of said platform being secured to the said differential housing through connecting arms 17.

Rigidly secured through the instrumentality of a bolt connection 18 to the end of the tractor frame is a draw bar 19, this bar extending rearwardly, and being supported by a cross strap 20, the ends of which are secured as at 21 upon the bottom of the platform 14. This draw bar 19 extends rearwardly of the said platform 14, and is formed with an opening 22 for obvious purposes.

Secured at one end to the platform 14, through the instrumentality of the said strap connections 21 are forwardly extending inclined brace rods 23, the front ends thereof being bolted at 24 to the differential housing of the tractor.

In view of the above description, it is believed by me that the advantages of this device will be readily appreciated by those skilled in the art, and although I have herein shown and described the preferred embodiment of the present invention, it is nevertheless to be understood that minor changes may be made therein, without departing from the spirit and scope of the invention as claimed.

Having thus described my invention, what I claim as new, and desire to secure by Letters-Patent is:

An attachment for tractors including a pair of fenders for the rear wheels of said tractors, said fenders having inner walls, the lower edges of which at the rear of the axle housing have bars secured thereto, a transversely extending bar connecting the lower rear ends of the fenders, a platform secured to the transverse bar, and the first mentioned bars, a draw bar receiving strap having an offset central portion to receive the draw bar of the tractor and having the end portions secured to the lower side of the platform, a pair of rod members arranged in spaced parallel relation, having the rear ends secured to the platform, said rods extending upwardly and forwardly relative to said platform, and means for securing the forward ends of said rod members to the differential housing, whereby the bar members cooperate with the draw bar receiving strap to release stress on said draw bar from the platform.

In testimony whereof I affix my signature.

FREEMAN HARRIS.